("12") United States Patent
Fairchild et al.

(10) Patent No.: US 10,281,957 B2
(45) Date of Patent: May 7, 2019

(54) MECHANICAL SHOCK PROTECTION FOR ELECTRONIC DEVICE

(71) Applicant: Western Digital Technologies, Inc., San Jose, CA (US)

(72) Inventors: Robert Fairchild, Santa Ana, CA (US); Julian Liao, Taoyuan (TW); Vincent Yang, Taoyuan (TW)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/594,447

(22) Filed: May 12, 2017

(65) Prior Publication Data

US 2018/0329457 A1  Nov. 15, 2018

(51) Int. Cl.
*G06F 1/16* (2006.01)
*G11B 33/08* (2006.01)
*G11B 33/12* (2006.01)

(52) U.S. Cl.
CPC ............ *G06F 1/1658* (2013.01); *G11B 33/08* (2013.01); *G11B 33/124* (2013.01)

(58) Field of Classification Search
CPC ......... G06F 1/1658; G06F 1/187; H05K 7/14; G11B 33/08; G11B 33/025
See application file for complete search history.

(56) References Cited

U.S. PATENT DOCUMENTS 5,332,306 A * 7/1994 Babb .................... H05K 7/1405
                                                    312/223.1
5,463,527 A   10/1995 Hager et al.
6,469,889 B1 * 10/2002 Gan ........................ G06F 1/184
                                                    361/679.33
6,567,265 B1   5/2003 Yamamura et al.
6,757,164 B2 * 6/2004 Lin .......................... G06F 1/184
                                                    248/201
6,948,967 B2 * 9/2005 Scherer ................ G11B 33/128
                                                    361/727
6,980,430 B2 * 12/2005 Su ........................... G06F 1/184
                                                    312/333

(Continued)

FOREIGN PATENT DOCUMENTS

TW          461558     10/2001
TW          M403727     5/2011
TW          M528508     9/2016

*Primary Examiner* — James Wu

(74) *Attorney, Agent, or Firm* — Barry IP Law, P.C.

(57) ABSTRACT

An electronic device includes an enclosure and an interior component. A flexible bar protects the interior component from mechanical shock. The flexible bar includes at least one component support portion configured to contact the interior component, and at least one enclosure support portion configured to contact the enclosure. According to one aspect, a first shape protrudes from a first surface of the flexible bar and is configured to receive force applied by the enclosure in a first dimension, and a second shape protrudes from a second surface of the flexible bar and is configured to receive force applied by the enclosure in a second dimension. According to another aspect, a first shape protrudes from a first surface of the flexible bar and is configured to receive force applied by the enclosure and elastically deform before a remaining portion of the flexible bar outside the first shape elastically deforms.

27 Claims, 8 Drawing Sheets

(56) References Cited

U.S. PATENT DOCUMENTS

| | | | |
|---|---|---|---|
| 7,515,407 B2* | 4/2009 | Goodman | G11B 33/08 |
| | | | 248/634 |
| 7,701,705 B1 | 4/2010 | Szeremeta | |
| 7,983,033 B2* | 7/2011 | Antonuccio | G11B 33/128 |
| | | | 312/223.2 |
| 8,300,352 B1 | 10/2012 | Larson et al. | |
| 8,462,460 B1 | 6/2013 | Szeremeta et al. | |
| 8,547,658 B1 | 10/2013 | Szeremeta | |
| 9,036,295 B1 | 5/2015 | Casey et al. | |
| 9,265,171 B1 | 2/2016 | Szeremeta et al. | |
| 9,352,700 B2* | 5/2016 | Prin | B60K 37/04 |
| 9,360,900 B1 | 6/2016 | Szeremeta et al. | |
| 2008/0197264 A1* | 8/2008 | Kuo | G11B 33/08 |
| | | | 248/570 |
| 2009/0031334 A1* | 1/2009 | Goodman | G11B 33/08 |
| | | | 720/692 |

* cited by examiner

MECHANICAL SHOCK PROTECTION FOR ELECTRONIC DEVICE

BACKGROUND

Electronic devices such as smartphones, tablets, external hard drives, and laptops may include mechanical shock protection to protect interior components from impacts, such as when the electronic device falls and hits the ground. Such mechanical shock protection often involves multiple elastomeric pads (e.g., rubber) or elastomeric grommets that are attached to components inside an enclosure for the electronic device.

However, conventional shock protection components generally do not provide the ability to tailor the amount of shock absorption for forces received by the component from different directions, such as by providing a greater amount of shock absorption in a vertical direction than in a horizontal direction. In addition, conventional shock protection often requires the careful placement and pre-compression of specially shaped parts such as elastomeric pads or grommets within an enclosure to fit particular surfaces or edges of an interior component and the enclosure, which can increase the cost and complexity of manufacturing the electronic device.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1A:
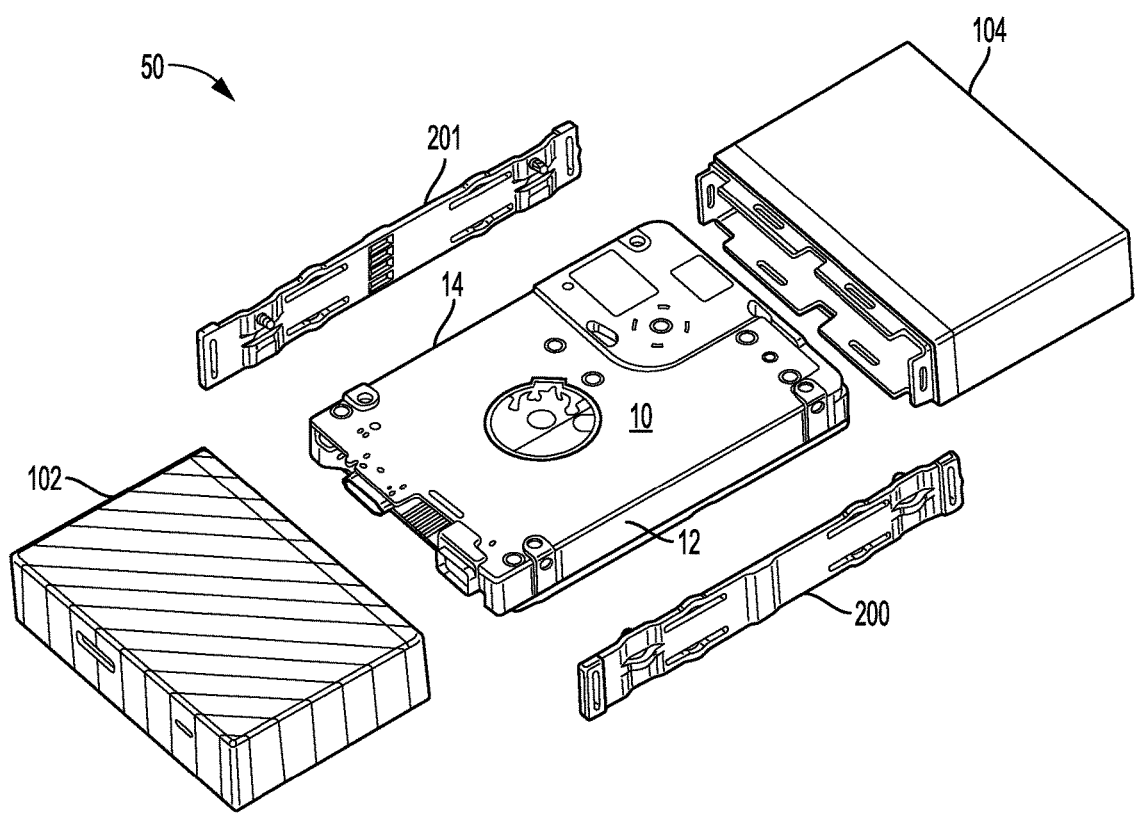
FIG. 1A is an exploded perspective view inside an enclosure of an electronic device with flexible bars according to an embodiment.
Figure 1B:
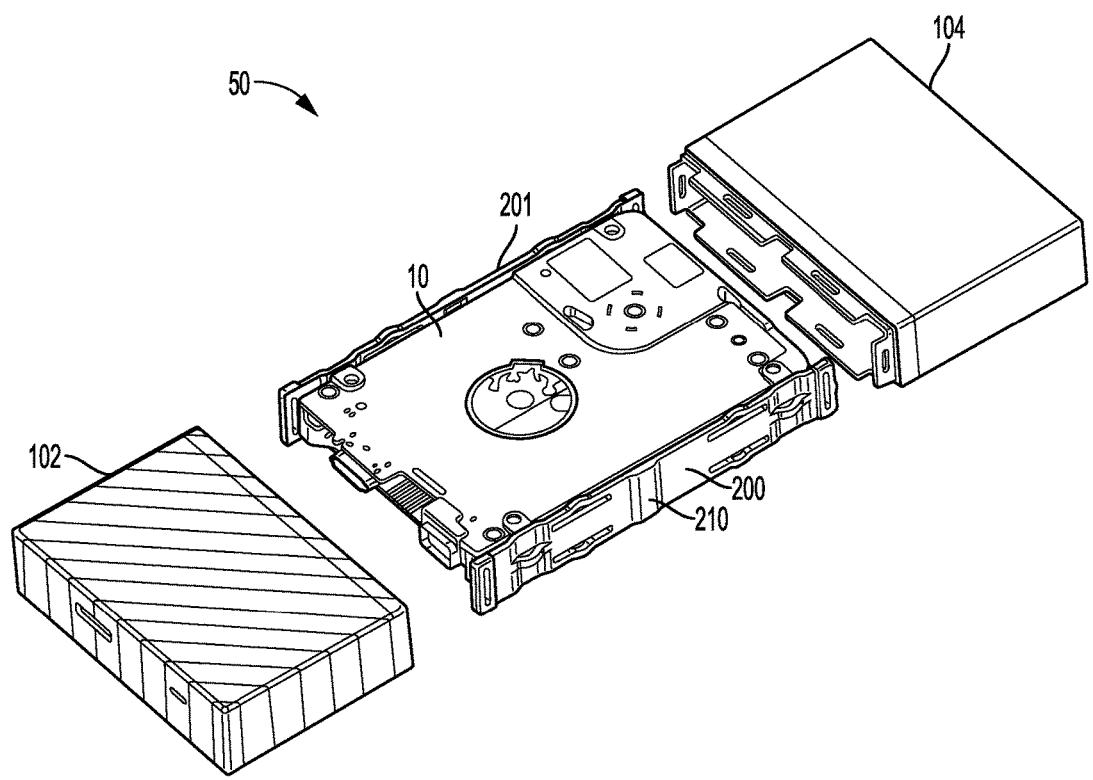
FIG. 1B is an exploded perspective view of the electronic device of FIG. 1A with flexible bars in contact with opposing sides of an interior component.
Figure 1C:
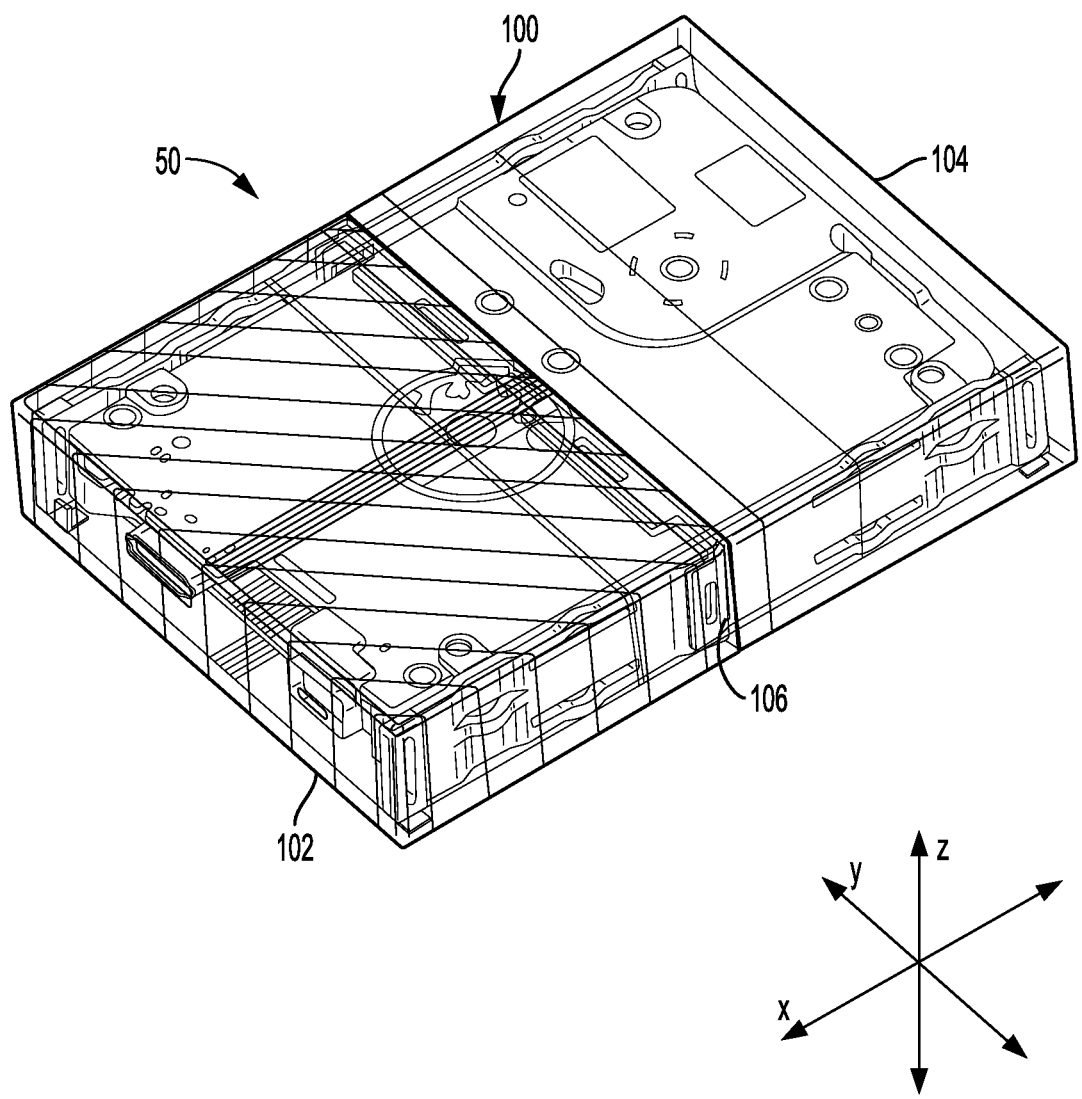
FIG. 1C is a perspective view of the electronic device of FIGS. 1A and 1B inside the enclosure when the enclosure is closed.

FIGS. 1A to 1C are perspective views of electronic device 50, which includes interior component 10, enclosure 100, and flexible bars 200 and 201 according to an embodiment. As shown in FIGS. 1A to 1C, interior component 10 and flexible bars 200 and 201 are housed within enclosure 100. Electronic device 50 can include, for example, a data storage device such as a hard disk drive or a solid-state drive. In other embodiments, electronic device 50 may include, for example, a smartphone, tablet, set-top box, or laptop. Interior component 10 can include, for example, hardware or other components such as circuitry for operation of electronic device 50.

As shown in the exploded views of FIGS. 1A and 1B, and in the assembled view of FIG. 1C, enclosure 100 includes first portion 102 and second portion 104 that are joined together with a centerline latch system along tabbed portion 106 of second portion 104. In the example of FIGS. 1A to 1C, first portion 102 and second portion 104 can be press fitted together so that tabs on second portion 104 lock into indentations on first portion 102 with an interference fit. Other implementations may provide a different way of assembling an enclosure, such as by using screws to secure a top portion of the enclosure to a bottom portion of the enclosure.

In the implementation of FIGS. 1B and 1C, flexible bar 200 includes plateau portion 210 to contact enclosure 100 at tabbed portion 106 where first portion 102 and second portion 104 of enclosure 100 join together. The contact between plateau portion 210 and enclosure 100 allows flexible bar 200 to provide additional structural stability to tabbed portion 106 to help keep first portion 102 and second portion 104 together during a mechanical shock event, such as an impact after falling. In some implementations, plateau portion 210 may also be biased within enclosure 100 to provide pressure onto tabbed portion 106 to improve the joining together or latching of first and second portions 102 and 104.

Flexible bars 200 and 201 are located on a first side 12 and a second side 14, respectively, of interior component 10. As shown in FIG. 1A, first side 12 is opposite second side 14. In comparison to conventional elastomeric pads, flexible bars 200 and 201 can allow for a simpler assembly of enclosure 100 since first and second portions 102 and 104 can be joined together with flexible bars 200 and 201 attached to interior component 10 without having to worry about elastomeric pads or grommets moving or remaining under compression during assembly of enclosure 100.

Figure 1D:
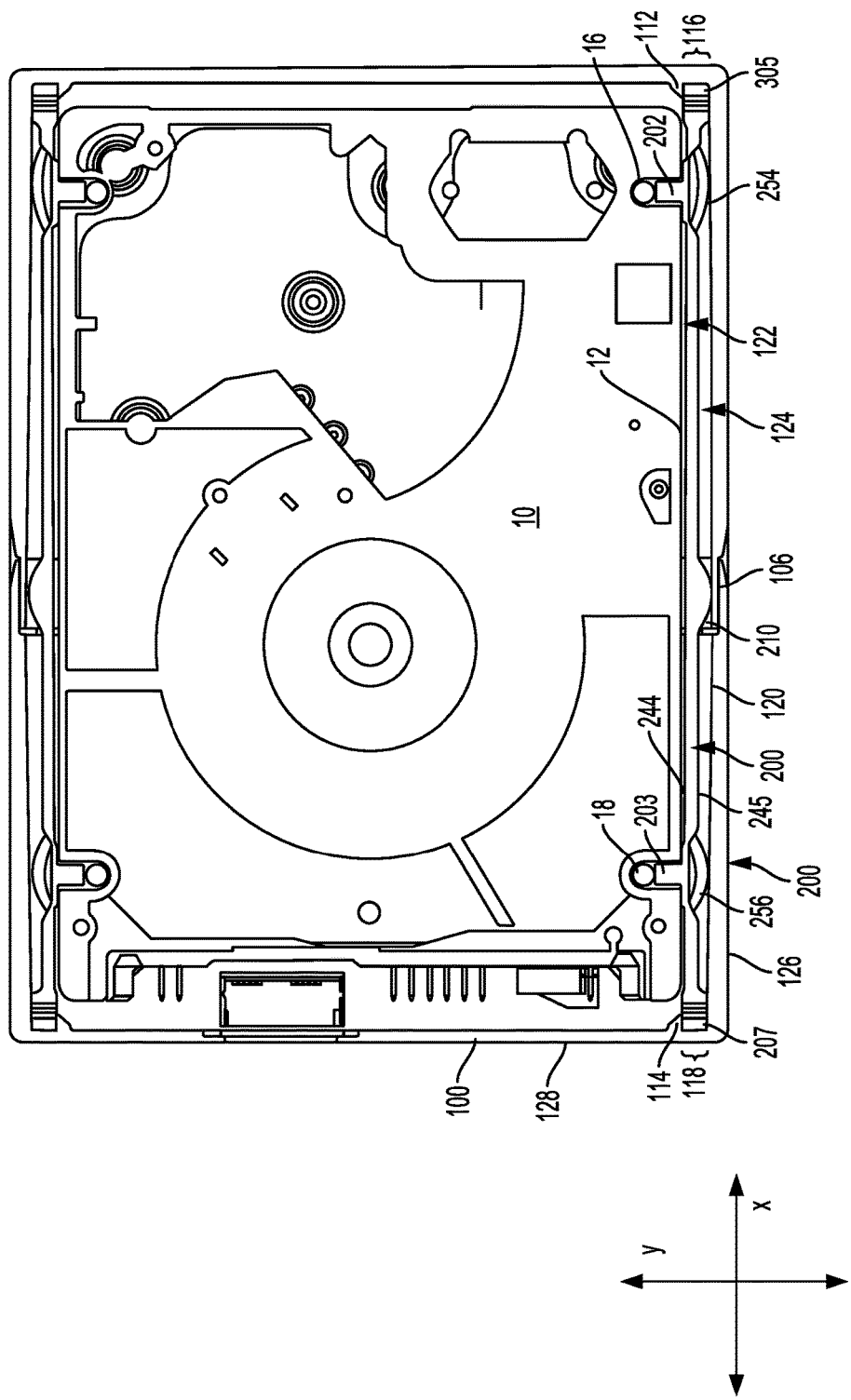
FIG. 1D is a top view inside the enclosure of FIG. 1C to show the arrangement of the flexible bars and the interior component inside the enclosure according to an embodiment.

As shown in the top view of FIG. 1D, flexible bar 200 includes component support portions 202 and 203, which contact mounts 16 and 18, respectively, on first side 12 of interior component 10. In the example of FIG. 1D, component support portions 202 and 203 are pins configured to press fit into holes on first side 12 of interior component 10 so as not to require screws to secure flexible bar 200 to first side 12 and further reduce a number of parts required for shock protection. Other implementations, however, may include different support portions such as screw holes for securing flexible bar 200 to interior component 10.

Flexible bar 200 also includes enclosure support portions 205 and 207 for contact with enclosure 100. As shown in FIG. 1D, enclosure support portions 205 and 207 fit into slots 116 and 118, respectively, of enclosure 100. In the example of FIG. 1D, slots 116 and 118 are spaces defined between interior enclosure surface 120 and each of ribs 112 and 114, respectively, to hold enclosure support portions 205 and 207 of flexible bar 200.

As shown in FIG. 1D, flexible bars 200 and 201 serve to provide shock isolation between enclosure 100 and interior component 10. In more detail, first surface 12 of interior component 10 and rear surface 244 of flexible bar 200 define sway space 122 to provide room for bending or elastic deformation of flexible bar 200 in a first direction into sway space 122 in a y dimension or along a y axis shown in FIG. 1D. In addition, front surface 245 of flexible bar 200 and side interior surface 120 of enclosure 100 define sway space 124 to provide room for bending or elastic deformation of flexible bar 200 in an opposite direction into sway space 124 in the y dimension.

The bending or elastic deformation of flexible bar 200 in sway spaces 122 and 124 ordinarily allows for the absorption of force in the y dimension by flexible bar 200, which provides shock protection to interior component 10 in the y dimension when side interior surface 120 of enclosure 100 applies a force at front side shapes 254 and 256 and enclosure support portions 205 and 207 of flexible bar 200. The application of such force in the y dimension could occur, for example, if enclosure 100 is dropped on exterior side surface 126 to cause compression of flexible bar 200.

In addition, sway spaces 122 and 124 also provide room for bending or elastic deformation of flexible bar 200 in the y dimension when absorbing force applied in the x dimension shown in FIG. 1D when enclosure 100 applies force at enclosure support portions 205 and 207. The application of such force in the x dimension could occur, for example, if electronic device 50 is dropped on exterior rear surface 128 of enclosure 100 to cause compression of flexible bar 200.

Figure 2A:
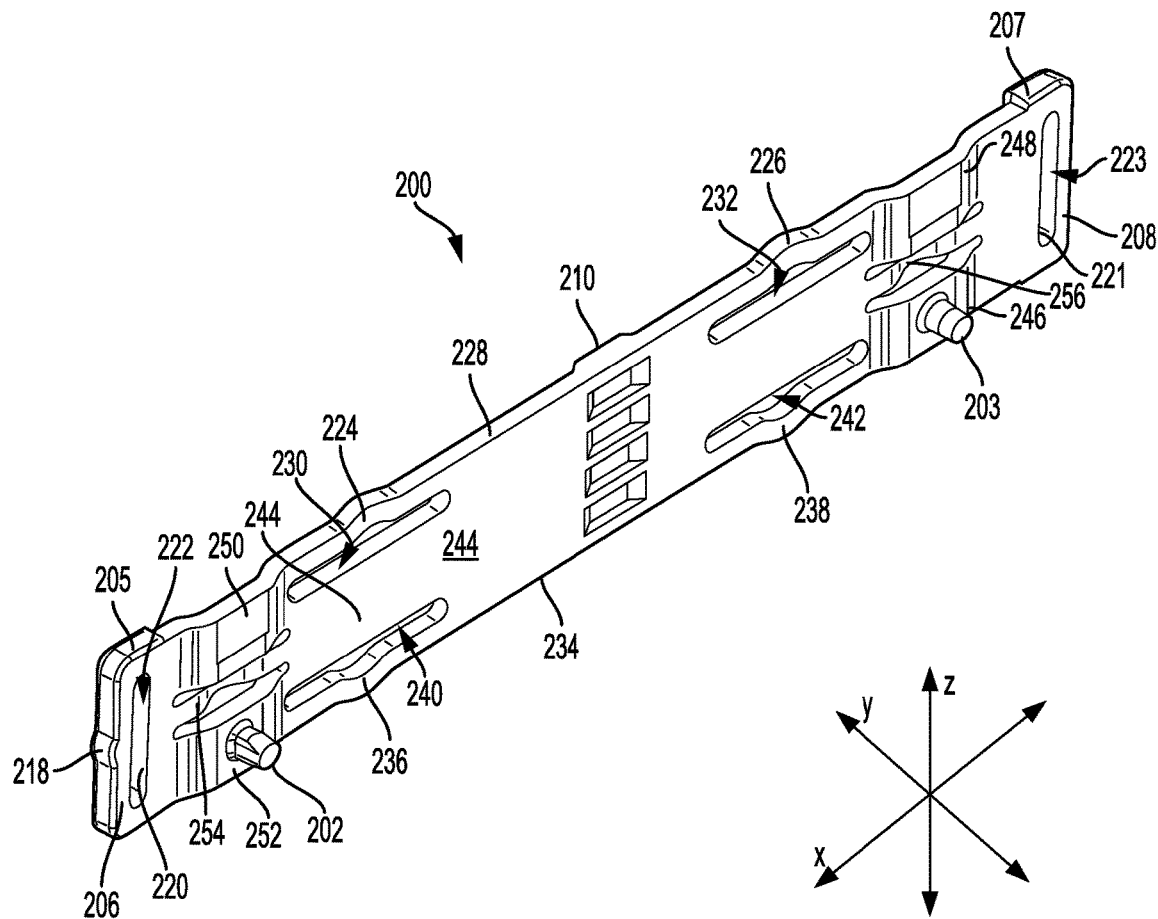
FIG. 2A is a perspective view of a flexible bar according to an embodiment.
Figure 2B:
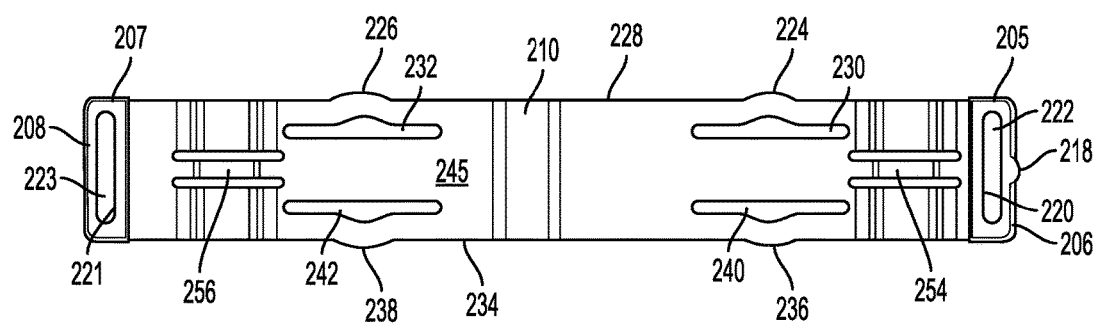
FIG. 2B is a front view of the flexible bar of FIG. 2A.
Figure 2C:
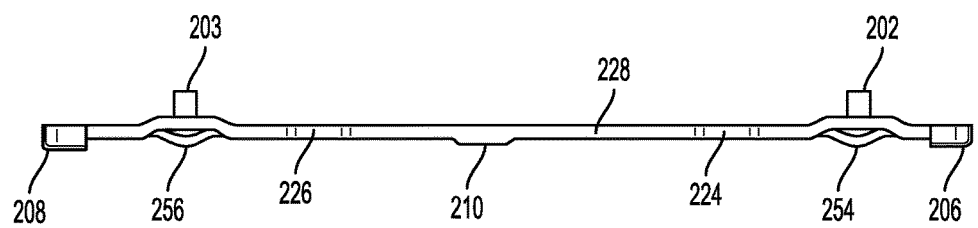
FIG. 2C is a top view of the flexible bar of FIGS. 2A and 2B.

FIGS. 2A to 2C are views of flexible bar 200 according to an embodiment. As shown in the perspective view of FIG. 2A and the front view of FIG. 2B, flexible bar 200 includes top shapes 224 and 226 protruding from top surface 228 of flexible bar 200. Top shapes 224 and 226 are configured to receive a downward force applied by enclosure 100 in a z dimension shown in FIG. 2A. Similarly, bottom shapes 236 and 238 protrude from bottom surface 234 and are configured to receive an upward force applied by enclosure 100 in the z dimension.

As shown in FIG. 1C, top surface 228 and an interior top surface of enclosure 100 define a top sway space to provide room for bending or elastic deformation of flexible bar 200 in a first direction into the top sway space in the z dimension shown in FIG. 1C. In addition, bottom surface 234 of flexible bar 200 and a bottom interior surface of enclosure 100 define a bottom sway space to provide room for bending or elastic deformation of flexible bar 200 in an opposite direction into the bottom sway space in the z dimension.

The bending or elastic deformation of flexible bar 200 in the top and bottom sway spaces ordinarily allows for the absorption of force in the z dimension by flexible bar 200, which provides shock protection to interior component 10 in the z dimension when the top or bottom interior surface of enclosure 100 applies force on flexible bar 200 at top shapes 224 and 226 or at bottom shapes 236 and 238, respectively. The application of such force in the z dimension could occur, for example, if electronic device 50 is dropped on its top or bottom exterior surface.

In some implementations, flexible bar 200 can be integrally formed by a molding process, such as injection molding. Since flexible bar 200 is formed as one piece, this ordinarily allows for a less expensive and simpler manufacturing process than using more shock protection components that may need to be carefully positioned and then screwed, glued, or compressed onto an enclosure or an interior component. In addition, a molding process can usually allow for the manufacture of flexible bars with a tighter tolerance or less variation than processes that involve the vulcanization or shaping of elastomeric material to fit a particular shape.

In some implementations, flexible bar 200 can be formed of a plastic material, for example, such as a PolyCarbonate (PC) material. As those of ordinary skill in the art will appreciate, the selection of a material for flexible bar 200 can depend upon design considerations such as the strength of the material to allow for the absorption of different amounts of force before permanent or plastic deformation, or the stiffness of the material to allow for different amounts of resistance to deformation for a given force.

In addition to the absorption of force by the bending or elastic deformation of flexible bar 200 into the sway spaces discussed above, shapes 224, 226, 236, 238, 206, 208, 246, 248, 250, 252, 254, and 256 of flexible bar 200 can provide localized first stages of force absorption through elastic deformation or bending of the shape before a second stage of force absorption through elastic deformation or bending of a remaining portion of flexible bar 200 outside of the shape. Providing two stages of force absorption can ordinarily allow for a more linear response in force absorption and provide a higher overall absorption of force by flexible bar 200.

Top shapes 224 and 226 protrude from top surface 228 to receive a downward force applied by enclosure 100 in the z dimension. As shown in FIGS. 2A and 2B, each of top shapes 224 and 226 define a hole or space in flexible bar 200 under top shapes 224 and 226. In addition, each of top shapes 224 and 226 includes a parabolic curve or has an arched shape that provides an area of contact with enclosure 100 at a vertex portion or portion near the top of the arch. Holes 230 and 232 can provide room for top shapes 224 and 226 to bend or elastically deform in response to a force applied by enclosure 100 in the z dimension.

In some implementations, top shapes 224 and 226 are configured to elastically deform or bend during a first stage of force absorption before a remaining portion of flexible bar 200 elastically deforms during a second stage of force absorption. The first stage of force absorption in some cases may provide enough shock protection for a given amount of force. In cases where the overall applied force over time is greater, the second stage of force absorption can provide additional shock protection. During the first stage of force absorption, top shapes 224 and 226 may elastically deform downward toward holes 230 and 232, respectively, such as by bending in the z dimension (e.g., vertical displacement of top shapes 224 and 226 downward) in response to a force applied in the z dimension. During the second stage of force absorption, flexible bar 200 may elastically deform downward into a sway space beneath flexible bar 200, such as by bending in the z dimension (e.g., vertical displacement of flexible bar 200 downward).

Bottom shapes 236 and 238 protrude from bottom surface 234 to receive an upward force applied by enclosure 100 in the z dimension. As shown in FIGS. 2A and 2B, each of bottom shapes 236 and 238 define a hole or space in flexible bar 200 above bottom shapes 236 and 238. In addition, each of bottom shapes 236 and 238 includes a parabolic curve or has an arched shape that provides an area of contact with enclosure 100 at a vertex portion or portion near the bottom of the arch. Holes 240 and 242 can provide room for bottom shapes 236 and 238 to bend or elastically deform in response to a force applied by enclosure 100 in the z dimension.

In some implementations, bottom shapes 236 and 238 are configured to elastically deform or bend during a first stage of force absorption before a remaining portion of flexible bar 200 elastically deforms during a second stage of force absorption. The first stage of force absorption in some cases may provide enough shock protection for a given amount of force. In cases where the overall applied force over time is greater, the second stage of force absorption can provide additional shock protection. During the first stage of force absorption, bottom shapes 236 and 238 may elastically deform upward toward holes 240 and 242, respectively, such as by bending in the z dimension (e.g., vertical displacement of bottom shapes 236 and 238 upward) in response to a force applied in the z dimension. During the second stage of force absorption, flexible bar 200 may elastically deform upward into a sway space above flexible bar 200, such as by bending in the z dimension (e.g., vertical displacement of flexible bar 200 upward).

End shapes 206 and 208 protrude from end surfaces 220 and 221, respectively, to receive forces applied by enclosure 100 in the x dimension. As shown in FIGS. 2A and 2B, each of end shapes 206 and 208 define a hole or space in flexible bar 200 between end surfaces 220 and 221, respectively. In addition, end shape 206 includes parabolic curve 218 that has an arched shape as an area of contact with enclosure 100 at a vertex portion of the arch. Holes 222 and 223 can provide room for end shapes 206 and 208 to bend or elastically deform in response to a force applied by enclosure 100 in the x dimension.

In some implementations, end shapes 206 and 208 are configured to elastically deform or bend during a first stage of force absorption before a remaining portion of flexible bar 200 elastically deforms during a second stage of force absorption. During the first stage of force absorption, end shapes 206 and 208 may elastically deform inward toward holes 222 and 223, respectively, such as by bending in the x dimension (e.g., horizontal displacement of end shapes 206 and 208 inward) in response to a force applied in the x dimension. During the second stage of force absorption, flexible bar 200 may elastically deform upward or downward into a sway space above or below flexible bar 200, such as by bending in the z dimension (e.g., vertical displacement of flexible bar 200 upward or downward). Flexible bar 200 during the second stage may alternatively or additionally elastically deform laterally into a sway space laterally adjacent flexible bar 200 (e.g., sway space 122 or 124 in FIG. 1D), such as by bending in the y dimension (e.g., lateral displacement of flexible bar 200 sideways).

Front side shapes 254 and 256 protrude from side surface 244 to receive a lateral force applied by enclosure 100 in they dimension. As shown in FIGS. 2A and 2C, each of front side shapes 254 and 256 includes a parabolic curve or has an arched shape that provides an area of contact with enclosure 100 at a vertex portion or portion near the top of the arch. The space behind front side shapes 254 and 256 can provide room for front side shapes 254 and 256 to bend or elastically deform in response to a force applied by enclosure 100 in the y dimension.

In some implementations, front side shapes 254 and 256 are configured to elastically deform or bend during a first stage of force absorption before a remaining portion of flexible bar 200 elastically deforms during a second stage of force absorption. The first stage of force absorption in some cases may provide enough shock protection for a given amount of force. In cases where the overall applied force over time is greater, the second stage of force absorption can provide additional shock protection.

During the first stage of force absorption, front side shapes 254 and 256 may elastically deform inward toward side surface 244, such as by bending in the y dimension (e.g., lateral displacement of front side shapes 254 and 256 sideways) in response to a force applied in the y dimension. During the second stage of force absorption, flexible bar 200 may elastically deform sideways into a sway space laterally adjacent flexible bar 200 (e.g., sway space 122 in FIG. 1D), such as by bending in the y dimension (e.g., lateral displacement of flexible bar 200).

Rear side shapes 246, 248, 250, and 252 protrude from rear side surface 244 to receive a lateral force applied by interior component 10 in the y dimension. As shown in FIGS. 2A and 2C, each of rear side shapes 246, 248, 250, and 252 includes a plateaued parabolic curve that provides an area of contact with interior component 10 at a plateau portion. The space behind rear side shapes 246, 248, 250, and 252 can provide room for the rear side shapes to bend or elastically deform in response to a force applied by interior component 10 in the y dimension. Such forces from interior component 10 may, for example, result from an impact on an opposite side of enclosure 100 that compresses rear side shapes 246, 248, 250, and 252.

In some implementations, rear side shapes 246, 248, 250, and 252 are configured to elastically deform or bend during a first stage of force absorption before a remaining portion of flexible bar 200 elastically deforms during a second stage of force absorption. The first stage of force absorption in some cases may provide enough shock protection for a given amount of force. In cases where the overall applied force over time is greater, the second stage of force absorption can provide additional shock protection.

During the first stage of force absorption, rear side shapes 246, 248, 250, and 252 may elastically deform back toward rear side surface 244, such as by bending in the y dimension (e.g., lateral displacement of rear side shapes 246, 248, 250, and 252) in response to a force applied in the y dimension. During the second stage of force absorption, flexible bar 200 may elastically deform sideways into a sway space laterally adjacent flexible bar 200 (e.g., sway space 124 in FIG. 1D), such as by bending in they dimension (e.g., lateral displacement of flexible bar 200).

By including different shapes as part of flexible bar 200 for receiving force in different dimensions, it is ordinarily possible to customize or tailor the amount of shock protection for a particular dimension, even when using a single component that may be integrally formed. The amount of force absorbed in different dimensions can vary depending on the shape used to absorb force for that dimension. For example, a particular geometry or shape protruding from a top surface of flexible bar 200 may provide for a greater absorption of force in the z dimension than a different geometry or shape protruding from an end surface of flexible bar 200 for absorption of force in the x dimension. Such customization can ordinarily allow for meeting different dimensional shock absorption specifications (e.g., 650 G for 1 ms in the z dimension and 350 G for 1 ms in the x and y dimensions) for electronic device 50, without having to individually manufacture and position different custom components.

As will be appreciated by those of ordinary skill in the art, the particular shapes and arrangements of flexible bar 200 may differ in different implementations. In this regard, FIGS. 3A to 5B discussed below provide examples of different shapes and arrangements for flexible bars that can be used in enclosure 100 to provide shock protection to interior component 10.

Figure 3A:
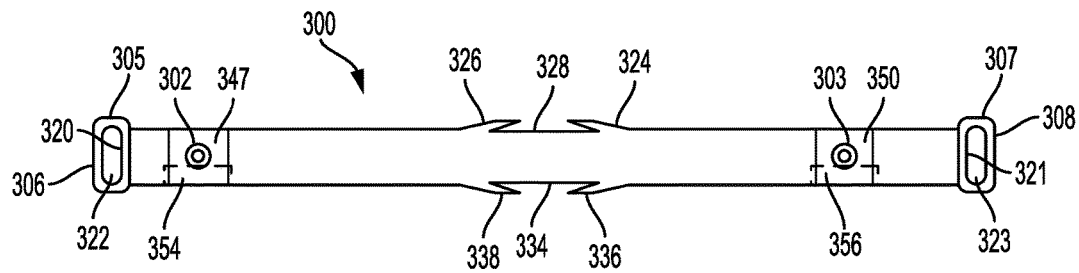
FIG. 3A is a rear view of a flexible bar according to an embodiment.
Figure 3B:
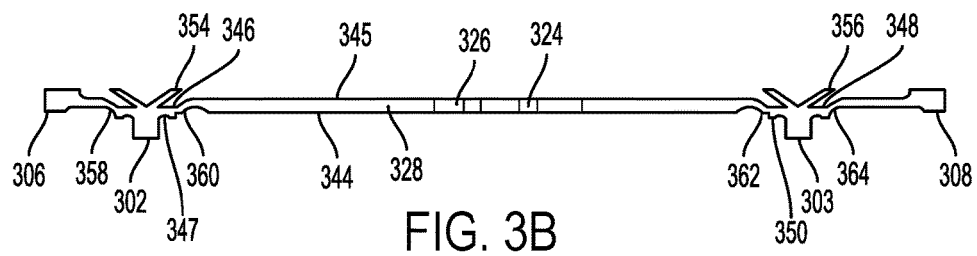
FIG. 3B is a top view of the flexible bar of FIG. 3A.

FIGS. 3A and 3B provide a rear view and a top view of flexible bar 300 according to an embodiment. Portions of flexible bar 300 that are similar to portions of flexible bar 200 in FIGS. 2A to 2C have been renumbered in FIGS. 3A and 3B with a 3 in the hundreds place. As shown in FIG. 3A, flexible bar 300 includes enclosure support portions 305 and 307 configured to contact an enclosure, such as enclosure 100 in slots 116 and 118.

In one aspect, flexible bar 300 differs from flexible bar 200 of FIGS. 2A to 2C in that top shapes 324 and 326 and bottom shapes 336 and 338 define two dimensionally open spaces with top surface 328 and bottom surface 334, respectively. These open spaces can allow room for the top and bottom shapes to provide localized first stages of force absorption through elastic deformation or bending of the shape before a remaining portion of flexible bar 300 elastically deforms during a second stage of force absorption.

In another aspect, flexible bar 300 differs from flexible bar 200 of FIGS. 2A to 2C in that a larger hole is defined by end shapes 306 and 308, which can allow for more elastic deformation of the end shapes. In yet another aspect in which flexible bar 300 differs, front side shapes 354 and 356 have a V shape that can provide two areas of contact with enclosure 100 for each front side shape and also define a two dimensionally open space with front side surfaces 346 and 348. In addition, front side shapes 354 and 356 are contiguous with rear side shapes 347 and 350.

The first stage of force absorption for top shapes 324 and 326 and bottom shapes 336 and 338 in some cases may provide enough shock protection for a given amount of force. In cases where the overall applied force over time is greater, a second stage of force absorption can provide additional shock protection. During the second stage of force absorption, flexible bar 300 may elastically deform downward or upward into a sway space beneath or above flexible bar 300, such as by bending in the z dimension (e.g., vertical displacement of flexible bar 300).

End shapes 306 and 308 protrude from end surfaces 320 and 321, respectively, to receive forces applied by enclosure 100 in the x dimension. As shown in FIG. 3A, each of end shapes 306 and 308 define a hole or space in flexible bar 300 between end surfaces 320 and 321, respectively. Holes 322 and 323 can provide room for end shapes 306 and 308 to bend or elastically deform in response to a force applied by enclosure 100 in the x dimension.

In some implementations, end shapes 306 and 308 are configured to elastically deform or bend during a first stage of force absorption before a remaining portion of flexible bar 300 elastically deforms during a second stage of force absorption. The first stage of force absorption in some cases may provide enough shock protection for a given amount of force. In cases where the overall applied force over time is greater, the second stage of force absorption can provide additional shock protection.

During the first stage of force absorption, end shapes 306 and 308 may elastically deform inward toward holes 322 and 323, respectively, such as by bending in the x dimension (e.g., horizontal displacement of end shapes 306 and 308 inward) in response to a force applied in the x dimension. During the second stage of force absorption, flexible bar 300 may elastically deform upward or downward into a sway space above or below flexible bar 300, such as by bending in the z dimension (e.g., vertical displacement of flexible bar 300 upward or downward). Flexible bar 300 during the second stage may alternatively or additionally elastically deform laterally into a sway space laterally adjacent flexible bar 300 (e.g., sway space 122 or 124 in FIG. 1D), such as by bending in the y dimension (e.g., lateral displacement of flexible bar 300 sideways). In this regard, bends 360 and 362 can absorb force in the x dimension during the second stage or serve to bias flexible bar 300 to bend outward or inward into a particular sway space.

Front side shapes 354 and 356 protrude from front side surfaces 346 and 348, respectively, to receive a lateral force applied by enclosure 100 in the y dimension. As shown in FIG. 3B, each of front side shapes 354 and 356 include a V shape that provides two areas of contact with enclosure 100 at end portions of each front side shape. The space behind front side shapes 354 and 356 can provide room for front side shapes 354 and 356 to bend or elastically deform in response to a force applied by enclosure 100 in the y dimension.

In some implementations, front side shapes 354 and 356 are configured to elastically deform or bend during a first stage of force absorption before a remaining portion of flexible bar 300 elastically deforms during a second stage of force absorption. The first stage of force absorption in some cases may provide enough shock protection for a given amount of force. In cases where the overall applied force over time is greater, the second stage of force absorption can provide additional shock protection.

During the first stage of force absorption, front side shapes 354 and 356 may elastically deform inward toward front side surfaces 346 and 348, respectively, such as by bending in the y dimension (e.g., lateral displacement of front side shapes 354 and 356) in response to a force applied in the y dimension. During the second stage of force absorption, flexible bar 300 may elastically deform sideways into a sway space laterally adjacent flexible bar 300 (e.g., sway space 122 in FIG. 1D) in response to compression transmitted through bends 360 and 362 of rear side shapes 347 and 350, respectively.

Rear side shapes 347 and 350 protrude from rear side surface 344 to receive a lateral force applied by interior component 10 in the y dimension. As shown in FIG. 3B, rear side shape 347 includes a plateau portion connected to bends 358 and 360 that provides an area of contact with interior component 10. Similarly, rear side shape 350 includes a plateau portion connected to bends 362 and 364 that provides an area of contact with interior component 10. The space behind rear side shapes 347 and 350 can provide room for the rear side shapes to bend or elastically deform in response to a force applied by interior component 10 in the y dimension. Such forces from interior component 10 may, for example, result from an impact on an opposite side of enclosure 100 that compresses rear side shapes 347 and 350.

In some implementations, rear side shapes 347 and 350 are configured to elastically deform or bend during a first stage of force absorption before a remaining portion of flexible bar 300 elastically deforms during a second stage of force absorption. The first stage of force absorption in some cases may provide enough shock protection for a given amount of force. In cases where the overall applied force over time is greater, the second stage of force absorption can provide additional shock protection.

During the first stage of force absorption, rear side shapes 347 and 350 may elastically deform outward toward front side surface 345, such as by bending in the y dimension (e.g., lateral displacement of rear side shapes 347 and 350) in response to a force applied in the y dimension. During the second stage of force absorption, flexible bar 300 may elastically deform sideways into a sway space laterally adjacent flexible bar 300 (e.g., sway space 124 in FIG. 1D), such as by bending in the y dimension (e.g., lateral displacement of flexible bar 300).

Figure 4A:
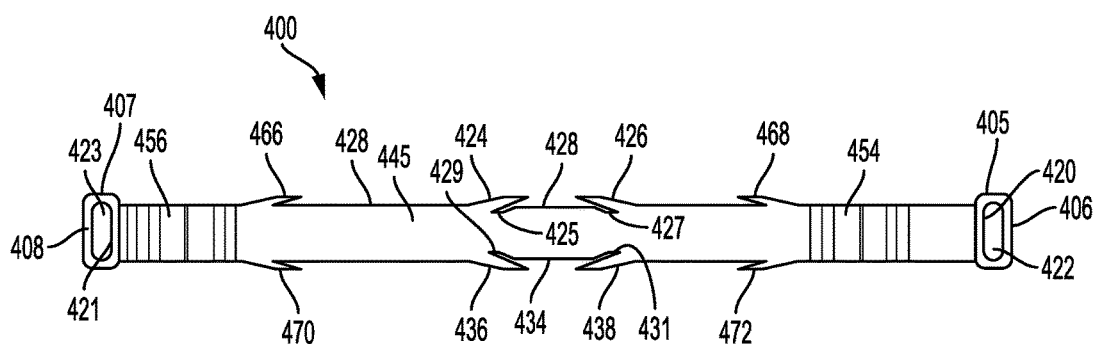
FIG. 4A is a front view of a flexible bar according to an embodiment.
Figure 4B:
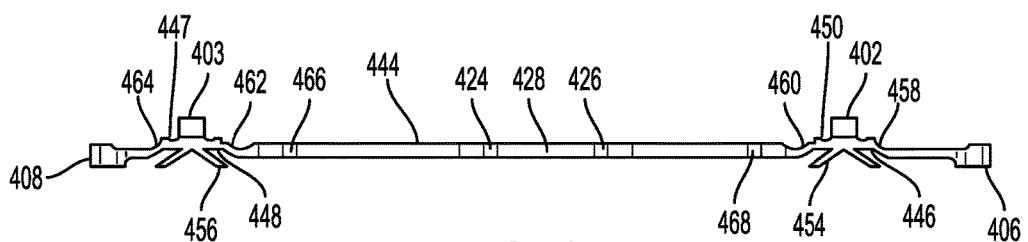
FIG. 4B is a top view of the flexible bar of FIG. 4A.

FIGS. 4A and 4B provide a front view and a top view of flexible bar 400 according to an embodiment. Portions of flexible bar 400 that are similar to portions of flexible bar 300 have been renumbered in FIGS. 4A and 4B with a 4 in the hundreds place. As shown in FIG. 4A, flexible bar 400 includes enclosure support portions 405 and 407 configured to contact an enclosure, such as enclosure 100 in slots 116 and 118.

In one aspect, flexible bar 400 differs from flexible bar 300 of FIGS. 3A and 3B in that top shapes 424 and 426 protrude farther from top surface 428 than additional top shapes 466 and 468 to absorb a different amount of force for the same amount of force applied by enclosure 100. In some implementations, the difference in height (i.e., distance from top surface 428) between top shapes 424 and 426 and additional top shapes 466 and 468 can provide an additional stage of force absorption in the z dimension. A similar height difference is shown for bottom shapes 436 and 438 with respect to additional bottom shapes 470 and 472 protruding from bottom surface 434.

In another difference from flexible bar 300 in FIGS. 3A and 3B, top shapes 424 and 426 in FIGS. 4A and 4B include indentations or notches 425 and 427 at the base of top shapes 424 and 426 that can allow for more bending or elasticity of top shapes 424 and 426 than for additional top shapes 466 and 468. Bottom shapes 436 and 438 include similar notches or indentations 429 and 431 along bottom surface 434.

In yet another aspect in which flexible bar 400 differs from flexible bar 300, front shapes 454 and 456 continue along a full height of flexible bar 400, as compared to front shapes 354 and 356 in FIGS. 3A and 3B, which extend in FIG. 3A only below component support portions 302 and 303, respectively. In addition to providing a larger contact area with enclosure 100, this arrangement of front shapes 454 and 456 can provide for symmetry of flexible bar 400 about a longitudinal centerline of flexible bar 400. Since flexible bar 400 is also symmetrical about its lateral centerline, flexible bar 400 can be interchangeably used to protect interior component 10 from mechanical shock with component support portions 402 and 403 in contact with either first side 12 or second side 14 (shown in FIG. 1A) of interior component 10. Such interchangeability can further reduce the number of parts and complexity of assembly for providing shock protection for electronic device 50.

The first stage of force absorption for top shapes 424 and 426 and bottom shapes 436 and 438 in some cases may provide enough shock protection for a given amount of force. In cases where the overall applied force over time is greater, a second stage of force absorption can be provided by additional top shapes 466 and 468 for additional shock protection. During the second stage of force absorption, additional top shapes 466 and 468 may elastically deform downward to absorb additional force. In this regard, additional top shapes 466 and 468 may be shorter so that additional top shapes 466 and 468 contact enclosure 100 at a later time during a shock event than top shapes 424 and 426 after enclosure 100 has compressed top shapes 424 and 426 enough to deform top shapes 424 and 426 downward to a distance from top surface 428 equal to a height of additional top shapes 466 and 468 from top surface 428.

In some cases, a third stage of force absorption may occur after bending or elastic deformation of additional top shapes 466 and 468 with flexible bar 400 elastically deforming downward into a sway space beneath flexible bar 400, such as by bending in the z dimension (e.g., vertical displacement of flexible bar 400). A similar progression of stages of deformation may also be used for bottom shapes 436 and 438 during a first stage of force absorption for force applied upward in the z dimension, followed by a second stage of force absorption by additional bottom shapes 470 and 472, and then followed by a third stage of force absorption by a bending or elastic deformation of a remaining portion of flexible bar 400.

End shapes 406 and 408 protrude from end surfaces 420 and 421, respectively, to receive forces applied by enclosure 100 in the x dimension. As shown in FIG. 4A, each of end shapes 406 and 408 define a hole or space in flexible bar 400 between end surfaces 420 and 421, respectively. Holes 422 and 423 can provide room for end shapes 406 and 408 to bend or elastically deform in response to a force applied by enclosure 100 in the x dimension.

Front side shapes 454 and 456 protrude from front side surfaces 446 and 448, respectively, which connect to front side surface 445, to receive a lateral force applied by enclosure 100 in the y dimension. As shown in FIG. 4B, each of front side shapes 454 and 456 include a V shape that provides two areas of contact with enclosure 100 at end portions of each front side shape. The space behind front side shapes 454 and 456 can provide room for front side shapes 454 and 456 to bend or elastically deform in response to a force applied by enclosure 100 in the y dimension.

Rear side shapes 447 and 450 protrude from rear side surface 444 to receive a lateral force applied by interior component 10 in the y dimension. As shown in FIG. 4B, rear side shape 447 includes a plateau portion connected to bends 458 and 460 that provides an area of contact with interior component 10. Similarly, rear side shape 450 includes a plateau portion connected to bends 462 and 464 that provides an area of contact with interior component 10. The space behind rear side shapes 447 and 450 can provide room for the rear side shapes to bend or elastically deform in response to a force applied by interior component 10 in the y dimension. Such forces from interior component 10 may, for example, result from an impact on an opposite side of enclosure 100 that compresses rear side shapes 447 and 450.

Figure 5A:
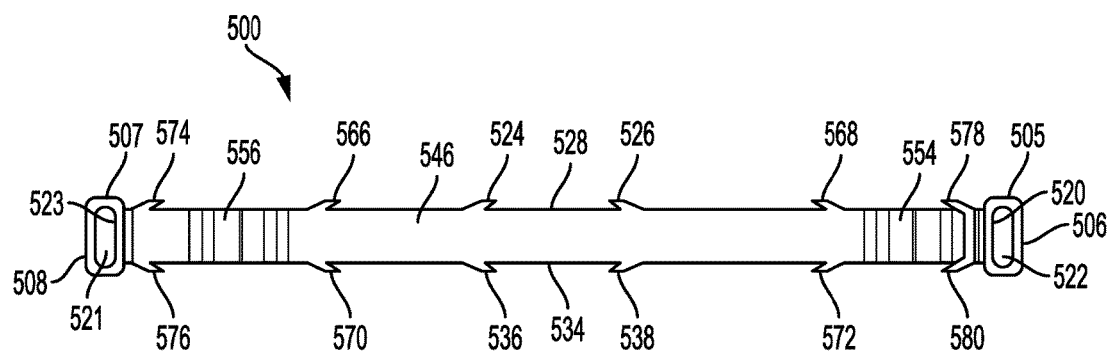
FIG. 5A is a front view of a flexible bar according to an embodiment.
Figure 5B:
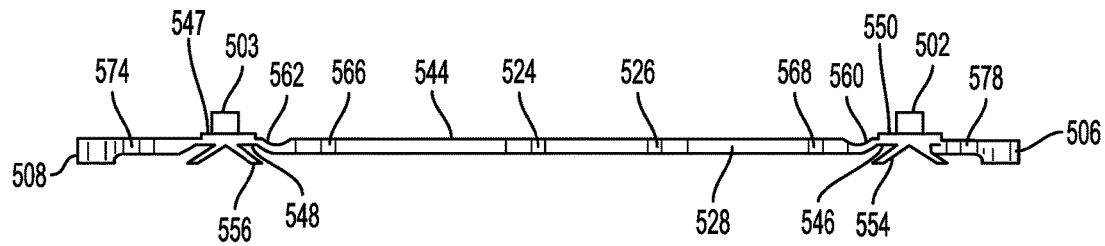
FIG. 5B is a top view of the flexible bar of FIG. 5A.

FIGS. 5A and 5B provide a front view and a top view of flexible bar 500 according to an embodiment. Portions of flexible bar 500 that are similar to portions of flexible bar 400 have been renumbered in FIGS. 5A and 5B with a 5 in the hundreds place. As shown in FIG. 5A, flexible bar 500 includes enclosure support portions 505 and 507 configured to contact an enclosure, such as enclosure 100 in slots 116 and 118.

In one aspect, flexible bar 500 differs from flexible bar 400 of FIGS. 4A and 4B in that an additional pair of top shapes 574 and 578 and an additional pair of bottom shapes 576 and 580 have been added closer to enclosure support portions 505 and 507. In addition, the heights of the top shapes and bottom shapes of flexible bar 500 in FIG. 5A do not differ as with the top and bottom shapes of flexible bar 400 in FIG. 4A.

As with flexible bar 400 in FIGS. 4A and 4B, flexible bar 500 in FIGS. 5A and 5B is longitudinally and laterally symmetrical so that flexible bar 500 can be interchangeably used to protect interior component 10 from mechanical shock with component support portions 502 and 503 in contact with either first side 12 or second side 14 (shown in FIG. 1A) of interior component 10. Such interchangeability can further reduce the number of parts and the complexity of assembly for providing shock protection for electronic device 50.

The first stage of force absorption for top shapes 524, 526, 566, 568, 574, and 578 (protruding from top surface 528), and for bottom shapes 536, 538, 570, 572, 576, and 580 (protruding from bottom surface 534) in some cases may provide enough shock protection for a given amount of force in the z dimension. In cases where the overall applied force over time is greater, a second stage of force absorption can be provided by flexible bar 500 elastically deforming upward or downward into a sway space above or beneath flexible bar 500, such as by bending in the z dimension (e.g., vertical displacement of flexible bar 500).

End shapes 506 and 508 protrude from end surfaces 520 and 521, respectively, to receive forces applied by enclosure 100 in the x dimension. As shown in FIG. 5A, each of end shapes 506 and 508 define a hole or space in flexible bar 500 between end surfaces 520 and 521, respectively. Holes 522 and 523 can provide room for end shapes 506 and 508 to bend or elastically deform in response to a force applied by enclosure 100 in the x dimension.

Front side shapes 554 and 556 protrude from front side surfaces 546 and 548, respectively, to receive a lateral force applied by enclosure 100 in the y dimension. As shown in FIG. 5B, each of front side shapes 554 and 556 include a V shape that provides two areas of contact with enclosure 100 at end portions of each front side shape. The space behind front side shapes 554 and 556 can provide room for front side shapes 554 and 556 to bend or elastically deform in response to a force applied by enclosure 100 in the y dimension.

Rear side shapes 547 and 550 protrude from rear side surface 544 to receive a lateral force applied by interior component 10 in the y dimension. As shown in FIG. 5B, rear side shape 547 includes a plateau portion connected to bend 562 that provides an area of contact with interior component 10. Similarly, rear side shape 550 includes a plateau portion connected to bend 560 that provides an area of contact with interior component 10. The space behind rear side shapes 547 and 550 can provide room for the rear side shapes to bend or elastically deform in response to a force applied by interior component 10 in the y dimension. Such forces from interior component 10 may, for example, result from an impact on an opposite side of enclosure 100 that compresses rear side shapes 547 and 550.

By providing flexible bars as described above, it is ordinarily possible to customize the amount of force absorption or shock protection for different dimensions using a single component, which can reduce manufacturing costs and assembly complexity.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive, and the scope of the disclosure is, therefore, indicated by the following claims rather than by the foregoing description.

All changes which come within the meaning and range of equivalency of the claims are to be embraced within their scope.

What is claimed is:

1. An electronic device, comprising:
   an enclosure;
   an interior component within the enclosure; and
   a flexible bar for protecting the interior component from mechanical shock, the flexible bar comprising:
   at least one component support portion configured to contact the interior component;
   at least one enclosure support portion configured to contact the enclosure;
   a first shape protruding in a direction perpendicular from a first surface of the flexible bar and configured to receive force applied onto the first shape by the enclosure in a first dimension due to impact on an exterior of the enclosure, wherein the first surface is located a fixed distance from a center of the flexible bar and the first shape extends from the first surface on opposing sides of a length of the first shape; and
   an additional shape protruding in the direction perpendicular from the first surface and configured to absorb a different amount of force than the first shape for the same amount of force applied to the additional shape and to the first shape, wherein the first shape protrudes farther from the first surface than the additional shape.

2. The electronic device of claim 1, further comprising a second shape protruding from a second surface of the flexible bar and configured to receive force applied by the enclosure in a second dimension.

3. The electronic device of claim 2, further comprising a third shape protruding from a third surface of the flexible bar and configured to receive force applied onto the third shape by the enclosure in a third dimension due to impact on the exterior of the enclosure.

4. The electronic device of claim 1, wherein the flexible bar is integrally formed by a molding process.

5. The electronic device of claim 1, wherein the first shape and the first surface are configured to define a sway space when the first shape is in contact with the enclosure, the sway space providing room between the first surface and the enclosure for elastic deformation of the flexible bar.

6. The electronic device of claim 1, wherein the first shape is configured to elastically deform due to a first force applied by the enclosure before the first surface elastically deforms due to the first force applied by the enclosure.

7. The electronic device of claim 1, wherein the at least one enclosure support portion is configured to fit into a slot defined by the enclosure.

8. The electronic device of claim 1, wherein the enclosure includes a first portion and a second portion joined together, and wherein the flexible bar further comprises a plateau portion protruding from a second surface of the flexible bar and configured to contact the enclosure at a location where the first portion and the second portion join together.

9. The electronic device of claim 1, wherein the first shape defines a hole in the flexible bar.

10. The electronic device of claim 1, wherein the first shape defines a two dimensionally open space in the flexible bar between the first surface and the first shape.

11. The electronic device of claim 1, wherein the first shape includes a parabolic curve.

12. The electronic device of claim 1, wherein the interior component includes a first side and a second side opposite the first side, and wherein the flexible bar is symmetrical about a centerline of the flexible bar to allow the flexible bar to be interchangeably used to protect the interior component from mechanical shock when the at least one component support portion is in contact with the first side of the interior component or when the at least one component support portion is in contact with the second side of the interior component.

13. An electronic device, comprising:
an enclosure;
an interior component within the enclosure; and
a flexible bar for protecting the interior component from mechanical shock, the flexible bar comprising:
 a plurality of component support portions configured to contact the interior component;
 at least one enclosure support portion configured to contact the enclosure; and
 a first shape protruding from a first surface of the flexible bar and configured to receive force applied by the enclosure in a first dimension lateral to a length of the flexible bar and elastically deform before a remaining portion of the flexible bar between a pair of the plurality of component support portions elastically deforms into a first sway space formed by a third surface of the flexible bar opposite the first surface and an exterior surface of the interior component.

14. The electronic device of claim 13, wherein the flexible bar is integrally formed by a molding process.

15. The electronic device of claim 13, further comprising a second shape protruding from a second surface of the flexible bar and configured to receive force applied by the enclosure in a second dimension.

16. The electronic device of claim 15, wherein the first shape is configured to absorb a different amount of force than the second shape for the same amount of force applied to the first shape and to the second shape.

17. The electronic device of claim 15, further comprising an additional shape protruding from the second surface of the flexible bar and configured to receive force applied by the enclosure in the second dimension.

18. The electronic device of claim 17, wherein the additional shape is configured to absorb a different amount of force than the second shape for the same amount of force applied to the additional shape and to the second shape.

19. The electronic device of claim 18, wherein the second shape protrudes farther from the second surface than the additional shape.

20. The electronic device of claim 15, wherein the second shape defines a hole in the flexible bar.

21. The electronic device of claim 15, wherein the second shape defines a two dimensionally open space in the flexible bar between the second surface and the second shape.

22. The electronic device of claim 13, wherein the first shape and the first surface are configured to define a second sway space when the first shape is in contact with the enclosure, the second sway space providing room between the first surface and the enclosure for elastic deformation of the flexible bar.

23. The electronic device of claim 13, wherein the at least one enclosure support portion is configured to fit into a slot defined by the enclosure.

24. The electronic device of claim 13, wherein the enclosure includes a first portion and a second portion joined together, and wherein the flexible bar further comprises a plateau portion protruding from the first surface of the flexible bar and configured to contact the enclosure at a location where the first portion and second portion join together.

25. The electronic device of claim 13, wherein the first shape includes a parabolic curve.

26. The electronic device of claim 13, wherein the interior component includes a first side and a second side opposite the first side, and wherein the flexible bar is symmetrical about a centerline of the flexible bar to allow the flexible bar to be interchangeably used to protect the interior component from mechanical shock when the at least one component support portion is in contact with the first side of the interior component or when the at least one component support portion is in contact with the second side of the interior component.

27. An electronic device, comprising:
an enclosure including a first portion and a second portion joined together;
an interior component within the enclosure; and
a flexible bar for protecting the interior component from mechanical shock, the flexible bar comprising:
 at least one component support portion configured to contact the interior component;
 at least one enclosure support portion configured to contact the enclosure;
 a first shape protruding from a first surface of the flexible bar and configured to receive force applied onto the first shape by the enclosure in a first dimension due to impact on an exterior of the enclosure; and
 a plateau portion protruding from a second surface of the flexible bar and configured to contact the enclosure at a location where the first portion and the second portion join together.

* * * * *